US008629943B2

(12) United States Patent
Takashima

(10) Patent No.: US 8,629,943 B2
(45) Date of Patent: Jan. 14, 2014

(54) TELEVISION DEVICE AND STAND

(75) Inventor: Hidetoshi Takashima, Gifu (JP)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 13/010,818

(22) Filed: Jan. 21, 2011

(65) Prior Publication Data

US 2011/0187946 A1 Aug. 4, 2011

(30) Foreign Application Priority Data

Jan. 29, 2010 (JP) ................................. 2010-019251

(51) Int. Cl.
*A47B 81/00* (2006.01)
(52) U.S. Cl.
USPC ........... 348/836; 248/127; 248/133; 248/140; 248/278.1
(58) Field of Classification Search
USPC .......................................... 348/836; 248/121
See application file for complete search history.

(56) References Cited

U.S. PATENT DOCUMENTS

| 6,378,830 B1 * | 4/2002 | Lu ............................. 248/278.1 |
| 7,744,045 B2 * | 6/2010 | Akagawa et al. ............. 248/121 |
| 2005/0258334 A1 * | 11/2005 | Hwang et al. ................ 248/920 |
| 2008/0143649 A1 | 6/2008 | Asaki et al. |

FOREIGN PATENT DOCUMENTS

JP 2007-234581 9/2007

* cited by examiner

*Primary Examiner* — Andy Rao
*Assistant Examiner* — Tyler Edwards
(74) *Attorney, Agent, or Firm* — Oblon, Spivak, McClelland, Maier & Neustadt, L.L.P.

(57) ABSTRACT

A television device includes a flat-plate main body, and a stand supporting the main body. The stand includes: a base member including a bottom face section and a pair of bearing sections projecting upward from the bottom face section; a shaft member bridged between the bearing sections; an arm member including a leg section rotatably fixed to the bearing sections, and a body section provided to bend from the leg section, provided with a lower screw hole and an upper screw hole, and fixed to the support object; and a receiving member including a lower section provided on the bottom face section, a middle section upstanding at a first angle from the lower section and including a first screw hole corresponding to the lower screw hole, and an upper section provided at a second angle from an upper end of the middle section and provided with a second screw hole corresponding to the upper screw hole.

8 Claims, 10 Drawing Sheets

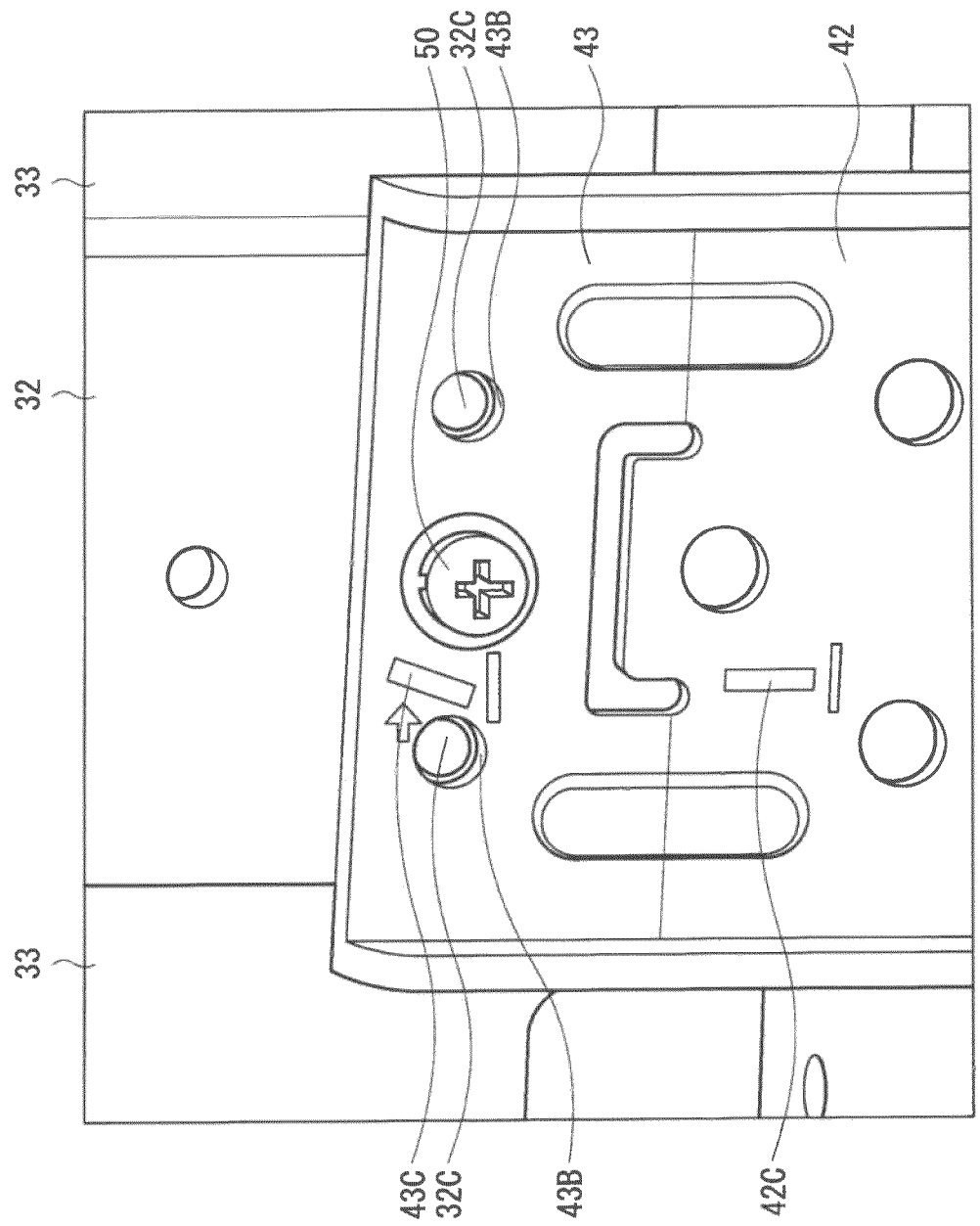

EMBODIMENT

TELEVISION DEVICE AND STAND

BACKGROUND OF THE INVENTION

1. Field of the Invention

The present invention relates to a stand suitable for a low-profile television device, and a television device including the same.

2. Description of the Related Art

In recent years, a low-profile television device using a liquid crystal, plasma, organic EL (electroluminescence) flat-panel or other display unit has become the main stream of a television device. In this low-profile television device, a model in which a flat-plate display unit body is supported by a stand is frequently seen (for example, refer to Japanese Unexamined Patent Publication No. 2007-234581 (FIG. 33)).

SUMMARY OF THE INVENTION

While the low-profile television device has been progressively spread, a swivel mechanism in which a main body is laterally rotated, and a tilt mechanism in which the main body is longitudinally (vertical direction) swung are desirably provided in a stand. A typical tilt mechanism of the related art has a structure that an assembled component called a hinge is used to maintain the angle of the tilt mechanism by frictional force. However, the use of such a hinge mechanism is limited to a small-size model, and the tilt mechanism is not adopted in a large-size model. The reasons are that it is difficult for a user alone to change a tilt angle, the component configuration is complicated because the main body is heavy in the large-size model and strength is necessary, and the cost is increased when power from a motor or the like is used.

In view of the foregoing, it is desirable to provide a television device in which a tilt angle is capable of being changed by a user alone with a simple structure without using power, and a stand.

According to an embodiment of the present invention, there is provided a television device including a flat-plate main body displaying an image; and a stand supporting the main body as a support object, and the stand includes the following components A to D:

A: a base member including a bottom face section and a pair of bearing sections projecting upward from the bottom face section, B: a shaft member bridged between the pair of bearing sections, C: an arm member including a leg section rotatably fixed to the pair of bearing sections by the shaft member, and a body section provided to bend from the leg section, provided with a lower screw hole and an upper screw hole, and fixed to a support object, and D: a receiving member including a lower section provided on the bottom face section, a middle section upstanding at a first angle from the lower section and including a first screw hole corresponding to the lower screw hole, and an upper section provided at a second angle from an upper end of the middle section and provided with a second screw hole corresponding to the upper screw hole.

According to an embodiment of the present invention, there is provided a stand including the following components A to D:

A: a base member including a bottom face section and a pair of bearing sections projecting upward from the bottom face section, B: a shaft member bridged between the pair of bearing sections, C: an arm member including a leg section rotatably fixed to the pair of bearing sections by the shaft member, and a body section provided to bend from the leg section, provided with a lower screw hole and an upper screw hole, and fixed to a support object, and D: a receiving member including a lower section provided on the bottom face section, a middle section upstanding at a first angle from the lower section and including a first screw hole corresponding to the lower screw hole, and an upper section provided at a second angle from an upper end of the middle section and provided with a second screw hole corresponding to the upper screw hole.

In the television device or the stand according to the embodiments of the present invention, an inclination angle of the body section provided to bend from the leg section is changed by rotation of the leg section of the arm member around the shaft member, and the body section is in contact with either the middle section or the upper section of the receiving member. In the case where the body section of the arm member is in contact with the middle section of the receiving member, it is possible to fix the body section of the arm member at the first angle by using the lower screw hole and the first screw hole. Meanwhile, in the case where the body section of the arm member is in contact with the upper section of the receiving member, it is possible to fix the body section of the arm member at the second angle by using the upper screw hole and the second screw hole. The inclination angle of the main body as the support object which is fixed to the body section of the arm member is thus changed.

According to the television device or the stand of the embodiments of the present invention, the leg section of the arm member is rotatable around the shaft member, while the body section bending from the leg section is provided with the lower screw hole and the upper screw hole, and the main body as the support object is fixed to the body section. Meanwhile, the lower section of the receiving member is placed on the base member, the middle section upstanding at the first angle from the lower section is provided with the first screw hole corresponding to the lower screw hole, and the upper section provided at the second angle from the middle section 42 is provided with the second screw hole corresponding to the upper screw hole. Therefore, the body section of the arm member is fixed to be in contact with either the middle section or the upper section of the receiving member by the rotation of the leg section of the arm member, and it is thus possible to switch the inclination angle of the main body as the support object which is fixed to the body section of the arm member. Thus, it is possible for the user alone to easily change the tilt angle of the main body without using power.

Other and further objects, features and advantages of the invention will appear more fully from the following description.

BRIEF DESCRIPTION OF THE DRAWING SECTIONS

FIG. 6 is a perspective view for explaining a dowel in the body section of the arm and a hole in an upper section of the holder illustrated in FIG. 2.

DETAILED DESCRIPTION OF THE PREFERRED EMBODIMENT

An embodiment of the present invention will be hereinafter described in detail with reference to the drawings.

Figure 1:
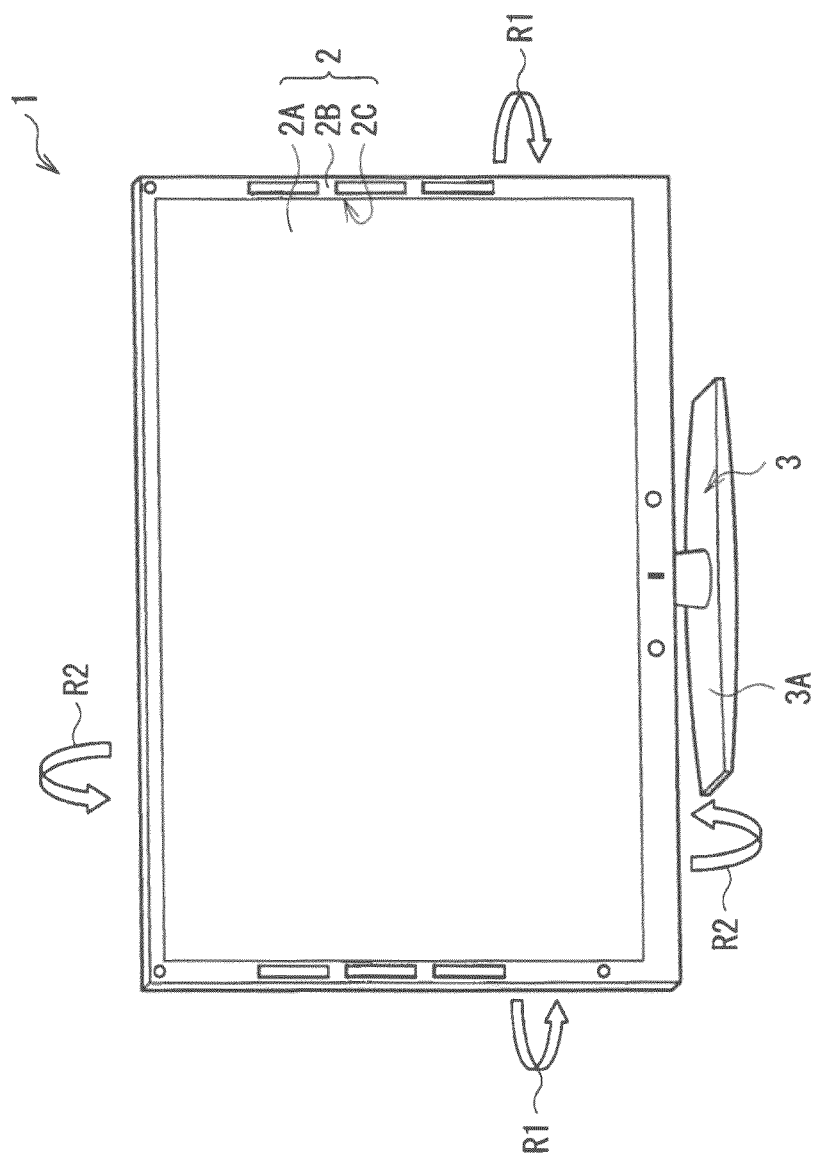
FIG. 1 is a perspective view illustrating an appearance of a television device according to an embodiment of the present invention.

FIG. 1 illustrates an appearance of a television device according to an embodiment of the present invention. A television device 1 is a stationary low-profile television device in which a flat-plate main body 2 displaying an image is supported by a stand 3 to be placed on a horizontal plane such as a rack and a pedestal.

In the main body 2, a flat-plate display panel 2A using liquid crystal, plasma, organic EL, inorganic EL, electrodeposition, electrochromic, or other display elements is accommodated in a housing 2B of resin, metal, or the like. A user can watch an image displayed on the display panel 2A from an aperture 2C on a front face of the housing 2B.

The stand 3 is an upstanding unit supporting from a rear face to a lower part of the main body 2 in the state where the main body 2 is disposed upright, that is, in the state where the display panel 2A is directed toward the user. The stand 3 is, for example, accommodated in an inverted T-shaped external member 3A of resin, metal, or the like. For example, the stand 3 is capable of a swivel operation in which the main body 2 is laterally rotated in an arrow R1 direction, and a tilt operation in which the main body 2 is longitudinally (vertical direction) swung in an arrow R2 direction. Hereinafter, a tilt operation R2 will be mainly described, while a swivel operation R1 is omitted.

Figure 2:
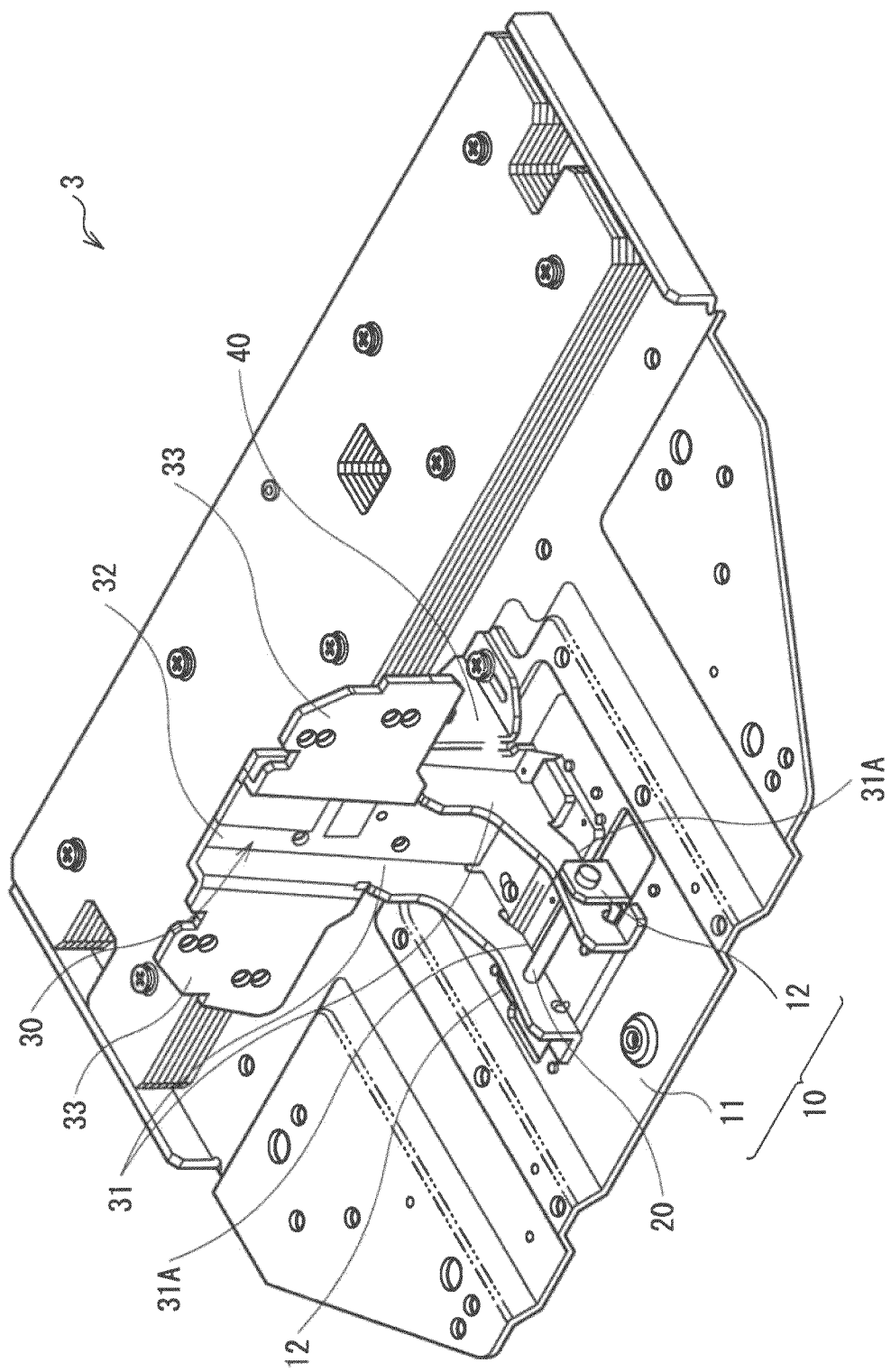
FIG. 2 is a perspective view illustrating an overall structure of a stand illustrated in FIG. 1.

FIG. 2 illustrates an internal structure when the external member 3A of the stand 3 illustrated in FIG. 1 is removed. The stand 3 enables the main body 2 to perform the tilt operation R2 described above, and has such a structure that, for example, an L-shaped arm (arm member) 30 is rotatably fixed to a base plate (base member) 10 by a shaft (shaft member) 20, and the rear face of the arm 30 is supported by a holder (receiving member) 40. Thereby, in the television device 1, the user alone can easily change the tilt angle with the stand 3 having a simple structure without using power.

The base plate 10 is a component forming a bottom face of the stand 3, that is, serves as a base of the stand 3. The base plate 10 includes, for example, a substantially-rectangle flat-plate bottom face section 11 obtained by cutting away two corners of a long side. On the surface of the bottom face section 11, a disposing section for disposing various types of components such as the shaft 20, the arm 30, and the holder 40, a printed circuit board, or the like is divided by a convex/concave, and appropriate screw holes are provided.

A pair of bearing sections 12 projecting upward are provided on the bottom face section 11. The bearing section 12 is, for example, formed by cutting the bottom face section 11 to obtain a rectangle shape with three cut sides, and bending that part upward.

The shaft 20 is a cylinder component bridged between the pair of bearing sections 12, and relating the base plate 10 and the arm 30 at the rotation center of the tilt operation R2 by the main body 2.

The arm 30 is a component fixing the main body 2 as a support object, and performs the tilt operation R2 of the main body 2 through the base plate 10 and the shaft 20. The arm 30 includes, for example, a pair of (two) leg sections 31 approximately parallel to the surface of the bottom face section 11, and a body section 32 bending upward from the leg sections 31.

The leg sections 31 are fixed to be rotatable to the pair of the bearing sections 12 by the shaft 20, and an inclination angle of the body section 32 in the vertical direction is changed according to the rotation of the leg sections 31. Lower sides 31A of the leg sections 31 are in contact with a lower section 41 of the holder 40, which will be described later, in the case where the inclination angle of the body section 32 is maximized (in the case where the inclination angle is a second angle θ2), and are away from the lower section 41 of the holder 40 in other cases.

The body section 32 is a flat plate connecting between the two leg sections 31, and provided to bend, for example, at an angle (90°+a maximum inclination angle of the body section 32, that is, 90°+the second angle θ2 which will be described later) to the lower sides 31A of the leg sections 31. A pair of blade sections 33 is provided on both sides of the body section 32, and a rear face of the housing 2B in the main body 2 as the support object is fixed to the blade sections 33. The blade sections 33 are provided in parallel to the body section 32, and the inclination angle of the body section 32 and the inclination angle of the main body 2 are thus equal to each other. The blade sections 33 are not necessarily provided depending on the size and the weight of the main body 2, and the rear face of the housing 2B in the main body 2 may be directly fixed to the body section 32.

Figure 3:
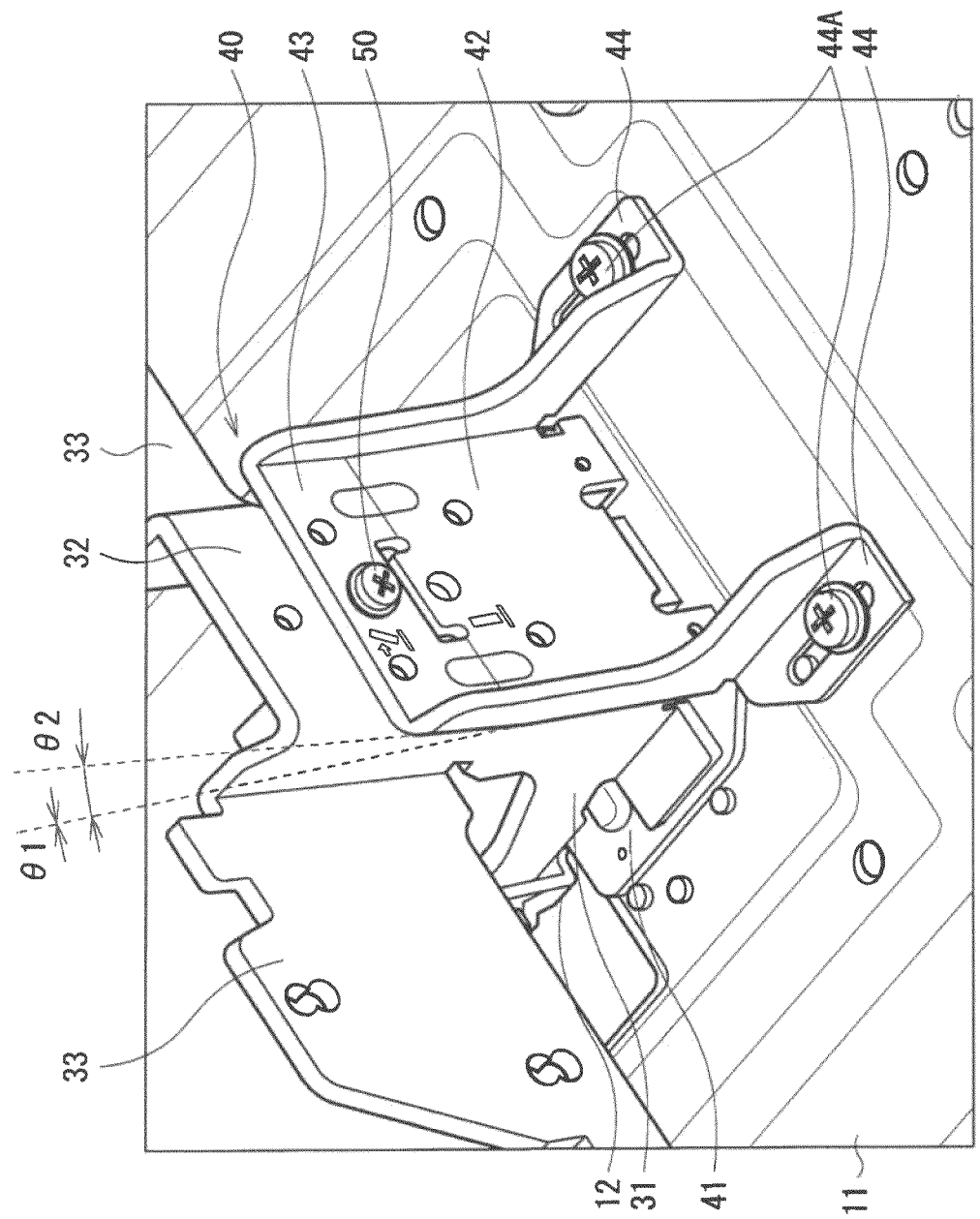
FIG. 3 is a perspective view of a holder illustrated in FIG. 2 as viewed from its rear face side.

FIG. 3 illustrates the structure of the holder 40 as viewed from its rear face side. The holder 40 is a component fixing the arm 30, and allowing the whole stand 3 to have strength. The holder 40 is in contact with the bottom face section 11 in the lower section 41, and a middle section 42 is upstanding at a first angle θ1, for example, in the vertical direction (0°) from the lower section 41. Further, from the upper end of the middle section 42, an upper section 43 is provided at the second angle θ2, for example, at an angle tilted at 5° from the vertical direction. As will be described later, the lower section 41 is not completely fixed to the bottom face section 11, and movable back and forth in the horizontal direction above the bottom face section 11.

The holder 40 includes an auxiliary fixing section 44 projecting to the rear face side of the middle section 42, and is preferably fixed to the bottom face section 11 in the auxiliary fixing section 44 by a screw 44A. It is possible to further improve the strength by increasing the number of places fixed by screws. In particular, this method is advantageous in the case where the width of the arm 30 and the width of the holder 40 are narrowed due to design restrictions, and it is difficult to obtain the sufficient strength, or the case where more reliable fixing is necessary.

The base plate 10, the arm 30, and the holder 40 each have a thickness of, for example, approximately 1.5 mm to 2.0 mm, and are preferably constituted of iron to allow the stand 3 to have the sufficient strength for supporting the heavy and large-size main body 2. The strength of the stand 3 is ensured by a seat 42B of the middle section 42 in the holder 40, which will be described later, a first convex 41A of the lower section 41 in the holder 40, a second convex 11A of the bottom face section 11 in the base plate 10, an ear piece 31D of the lower side 31A in the leg section 31, and the like, in addition to by sufficiently increasing the area of the holder 40 supporting the body section 32 of the arm 30 and the area of the blade sections 33 fixing the main body 2, and providing the large number of screw fixing places such as the auxiliary fixing section 44.

Figure 4:
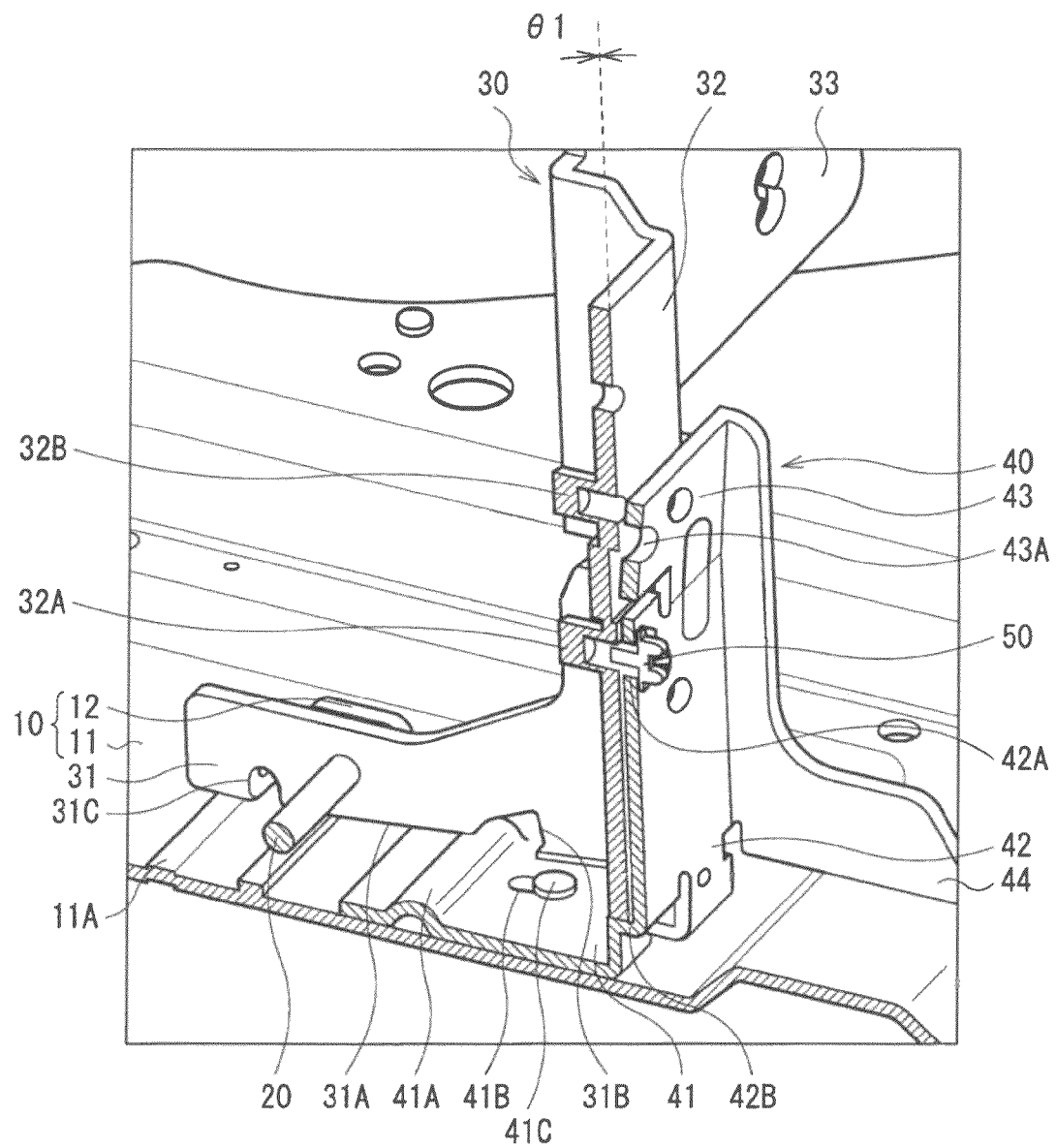
FIG. 4 is a perspective view of the case where a body section of an arm illustrated in FIG. 2 is placed at 0°.

FIG. 4 illustrates the positional relationship of the base plate 10, the shaft 20, the arm 30, and the holder 40 in the case where the body section 32 of the arm 30 is placed at the first angle $\theta 1=0°$. A lower screw hole 32A and an upper screw hole 32B are provided in the body section 32 of the arm 30. A first screw hole 42A corresponding to the lower screw hole 32A is provided in the middle section 42 of the holder 40. A second screw hole 43A corresponding to the upper screw hole 32B is provided in the upper section 43 of the holder 40.

In the case where the body section 32 of the arm 30 is placed at the first angle $\theta 1=0°$, the body section 32 of the arm 30 is in contact with the middle section 42 of the holder 40, and vertical to the base plate 10. At this time, the lower side 31A of the leg section 31 and the lower section 41 of the holder 40 are away from each other, and a gap is generated therebetween.

In this state, it is possible to fix the body section 32 of the arm 30 at the first angle $\theta 1=0°$ with the sufficient strength by fixing the body section 32 of the arm 30 to the middle section 42 of the holder 40 with a screw 50 through use of the lower screw hole 32A and the first screw hole 42A. Thus, the main body 2 fixed to the body section 32 is also fixed at the first angle $\theta 1=0°$.

In the case where the body section 32 of the arm 30 is placed at the first angle $\theta 1=0°$, the middle section 42 of the holder 40 preferably includes the stepped seat 42B mounting the lower end of the body section 32 in the arm 30. Thereby, it is possible to obtain more reliable strength.

The lower section 41 of the holder 40 preferably includes the first convex 41A mounting the lower sides 31A of the leg sections 31 in the case where body section 32 of the arm 30 is placed at the first angle $\theta 1=0°$, and the bottom face section 11 of the base plate 10 preferably includes the second convex 11A mounting the lower sides 31A of the leg sections 31 in the case where the body section 32 of the arm 30 is placed at the first angle $\theta 1=0°$. In this manner, the arm 30 is supported by the three places of the seat 42B of the middle section 42 in the holder 40, the first convex 41A of the lower section 41 in the holder 40, and the second convex 11A of the bottom face section 11 in the base plate 10, and it is thereby possible to obtain more reliable strength. If necessary, the arm 30 may include a first concave 31B and a second concave 31C on the lower sides 31A of the leg sections 31.

The lower section 41 of the holder 40 is fixed to be movable back and forth in the longitudinal direction of a long hole 41B to the bottom face section 11 of the base plate 10 by the long hole 41B and a guide projection 41C inserted into the long hole 41B. The lower section 41 of the holder 40 is fixable to the bottom face section 11 of the base plate 10 in a desired position by a method such as caulking. This enables the holder 40 to move in parallel above the bottom face section 11 correspondingly to rotation displacement of the arm 30, and to reliably support the arm 30 in a desired position at a desired angle.

Figure 5:
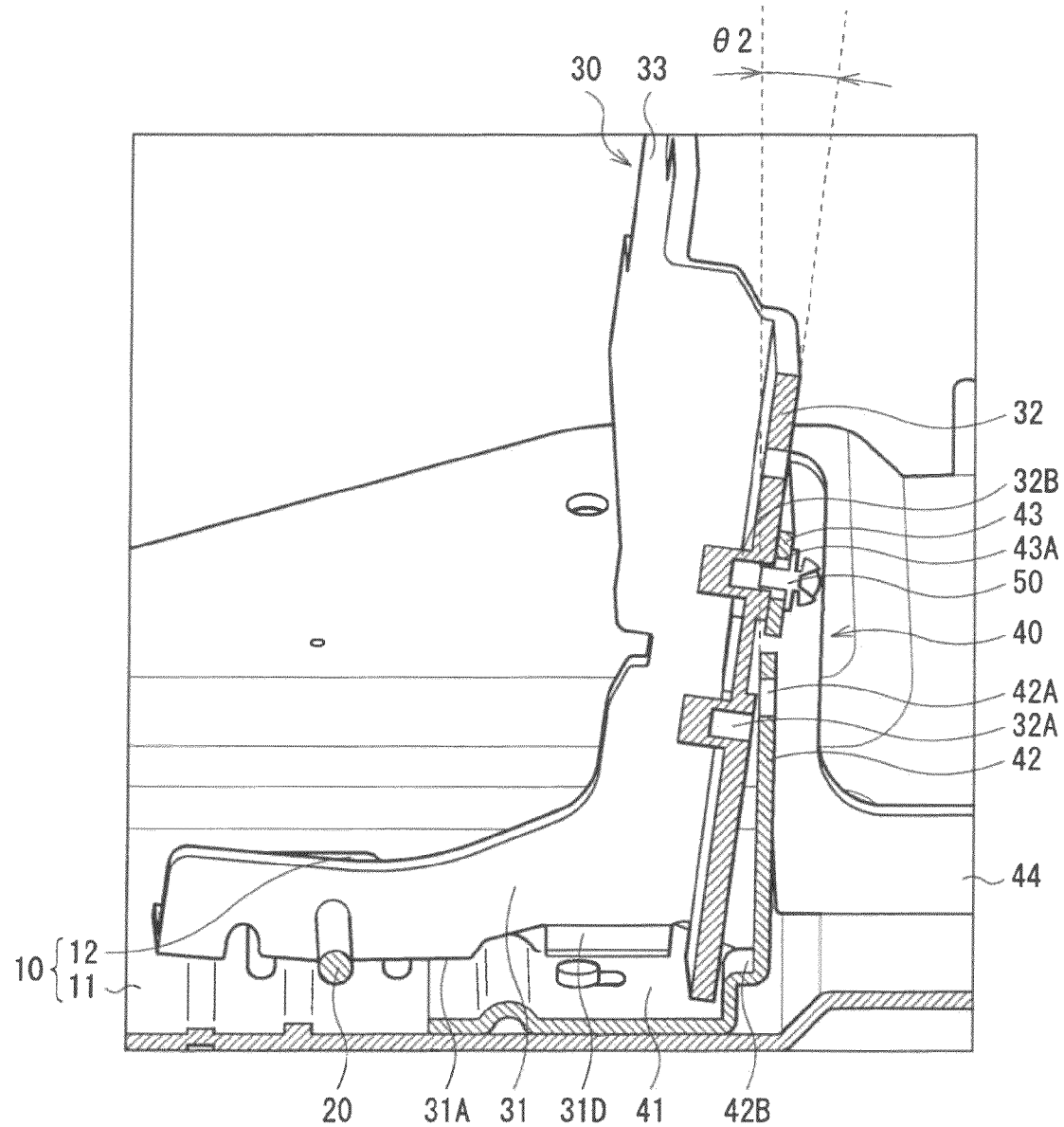
FIG. 5 is a perspective view of the case where the body section of the arm illustrated in FIG. 2 is placed at 5°.

FIG. 5 illustrates the positional relationship of the base plate 10, the shaft 20, the arm 30, and the holder 40 in the case where the body section 32 of the arm 30 is placed at the second angle $\theta 2=5°$.

In the case where the body section 32 of the arm 30 is placed at the second angle $\theta 2=5°$, the body section 32 in the arm 30 is in contact with the upper section 43 of the holder 40, and has an angle of 85° to the base plate 10. At this time, the lower sides 31A of the leg sections 31 are in contact with the lower section 41 of the holder 40.

In this state, it is possible to fix the body section 32 of the arm 30 at the second angle $\theta 2=5°$ with the sufficient strength by fixing the body section 32 of the arm 30 to the upper section 43 of the holder 40 with the screw 50 through use of the upper screw hole 32B and the second screw hole 43A. Thus, the main body 2 fixed to the body section 32 is also fixed at the second angle $\theta 2=5°$.

Further, the arm 30 includes the ear piece 31D laterally projecting from the lower side 31A of the leg section 31, and the ear piece 31D is preferably in surface-contact with the lower section 41 of the holder 40 in the case where the body section 32 of the arm 30 is placed at the second angle $\theta 2=5°$. Thereby, it is possible to obtain more reliable strength compared with the case where only the lower side 31A of the leg section 31 is in line-contact with the lower section 41 of the holder 40.

FIG. 6 illustrates the structure of the arm 30 and the holder 40 as viewed from their rear face sides in the case where the body section 32 of the arm 30 is placed at the second angle $\theta 2=5°$. The body section 32 of the arm 30 includes a dowel 32C in the vicinity of the upper screw hole 32B, and the upper section 43 of the holder 40 preferably includes a hole 43B in which the dowel 32C is fitted in the case where the body section 32 of the arm 30 is placed at the second angle $\theta 2=5°$. When the user performs the tilt operation, the user easily confirms that the angle is fixed, and operation feeling may be improved. If necessary, the size of the dowel 32C and the size of the hole 43B are set so that shaking of the arm 30 is controlled to improve stability of the tilt angle of the main body 2. The same number of the dowel 32C and the hole 43B (for example, one to one) are preferably provided, for example, in symmetric positions (for example, both sides) to the upper screw hole 32B at the same height as the upper screw hole 32B.

On the rear face of the holder 40, marks 42C and 43C such as illustrations indicating the tilt angle of the main body 2 are preferably provided in the vicinity of the first screw hole 42A and the vicinity of the second screw hole 43A. It is thus possible to improve convenience of the user, operation efficiency, and the like.

In the television device 1, the tilt operation R2 of the main body 2 may be performed, for example, as will be described next.

Figure 7A:
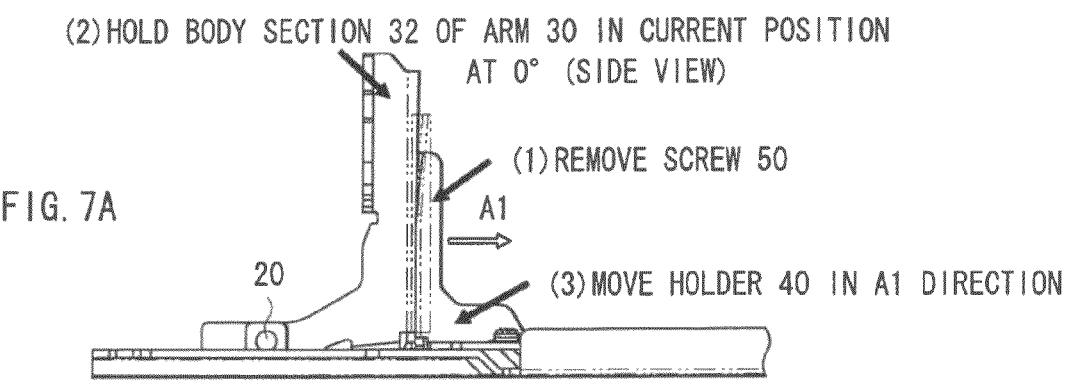
FIGS. 7A and 7B are views for explaining movement of the stand when an angle is changed from 0° to 5°.
Figure 7B:
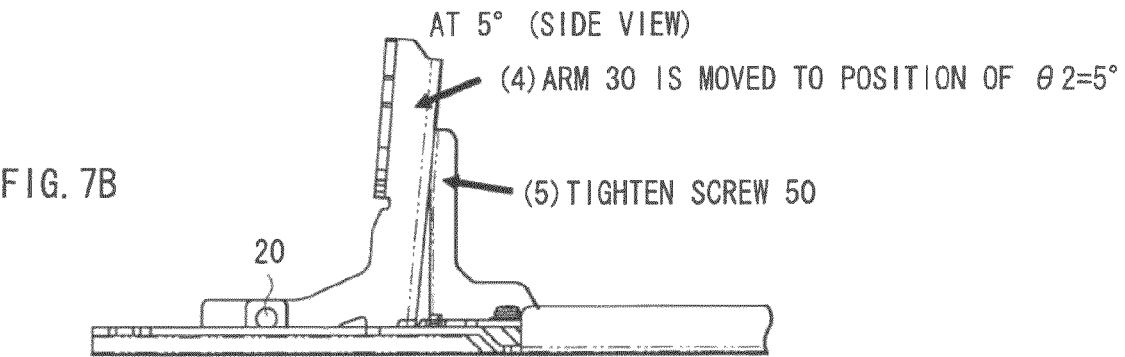

FIGS. 7A and 7B illustrate movement of the stand 3 when the angle of the body section 32 of the arm 30 is changed from the first angle $\theta 1=0°$ to the second angle $\theta 2=5°$. First, as illustrated in FIG. 7A, (1) the screw 50 is removed while the body section 32 of the arm 30 is placed at the first angle $\theta 1=0°$. Next, (2) the body section 32 of the arm 30 is held in its current position. Next, (3) the holder 40 is moved in an arrow A1 direction (right direction of the drawing surface).

Thereby, as illustrated in FIG. 7B, (4) the arm 30 is moved to the position of the second angle $\theta 2=5°$, and the body section 32 of the arm 30 is in contact with the upper section 43 of the holder 40. After that, (5) the screw 50 is tightened to fix the body section 32 of the arm 30 to the upper section 43 of the holder 40. Thus, the main body 2 fixed to the body section 32 is also fixed at the second angle θ2=5°.

Figure 8A:
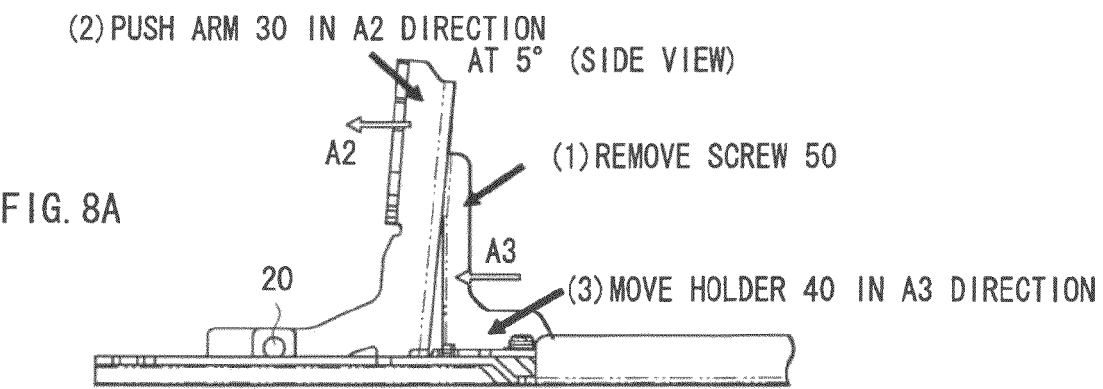
FIGS. 8A and 8B are views for explaining movement of the stand when the angle is changed from 5° to 0°.
Figure 8B:
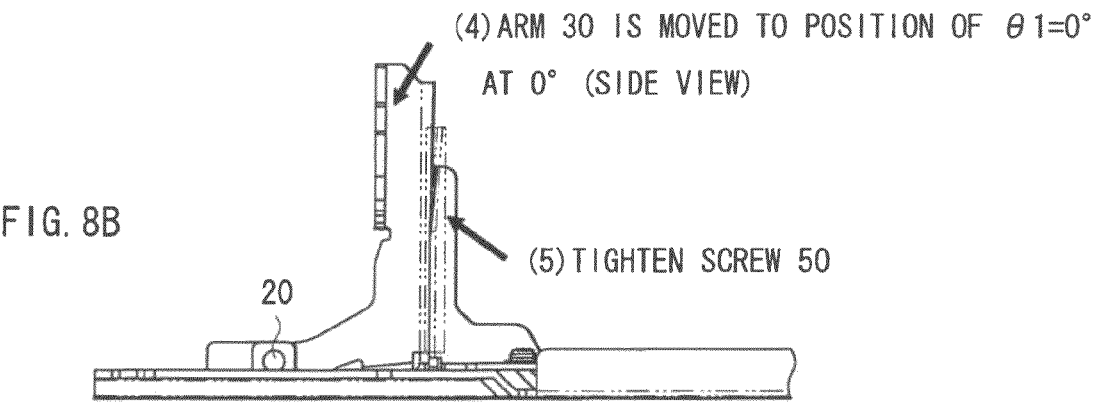

FIGS. 8A and 8B illustrate movement of the stand 3 when the angle of the body section 32 of the arm 30 is changed from the second angle θ2=5° to the first angle θ1=0°. First, as illustrated in FIG. 8A, (1) the screw 50 is removed while the body section 32 of the arm 30 is placed at the second angle θ2=5°. Next, (2) the body section 32 of the arm 30 is pushed in an arrow A2 direction (left direction of the drawing surface). Next, (3) the holder 40 is moved in an arrow A3 direction (left direction of the drawing surface).

Thereby, as illustrated in FIG. 8B, (4) the arm 30 is moved to the position of the first angle θ1=0°, and the body section 32 of the arm 30 is contact with the middle section 42 of the holder 40. After that, (5) the screw 50 is tightened to fix the body section 32 of the arm 30 to the middle section 42 of the holder 40. Thus, the main body 2 fixed to the body section 32 is also fixed at the first angle θ1=0°.

In the television device 1, the inclination angle of the body section 32 provided to bend from the leg sections 31 is changed by rotation of the leg sections 31 of the arm 30 around the shaft 20, and the body section 32 is in contact with either the middle section 42 or the upper section 43 of the holder 40. In the case where the body section 32 of the arm 30 is in contact with the middle section 42 of the holder 40, it is possible to fix the body section 32 of the arm 30 at the first angle θ1=0° by using the lower screw hole 32A and the first screw hole 42A. Meanwhile, in the case where the body section 32 of the arm 30 is in contact with the upper section 43 of the holder 40, it is possible to fix the body section 32 of the arm 30 at the second angle θ2=5° by using the upper screw hole 32B and the second screw hole 43A. The tilt angle of the main body 2 as the support object which is fixed to the body section 32 of the arm 30 is thus changed to either the first angle θ1=0° or the second angle θ2=5°.

Figure 9B:
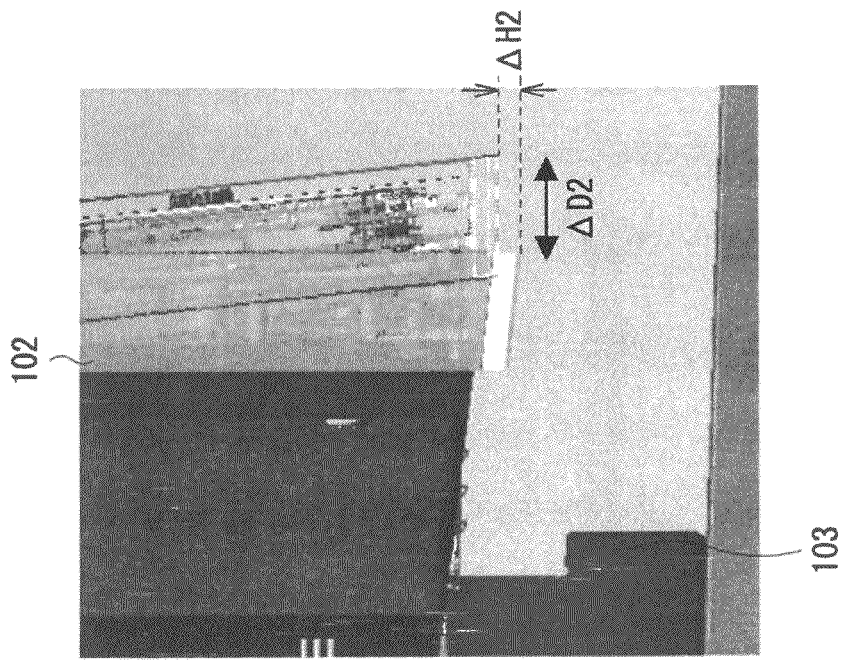
FIGS. 9A and 9B are views comparing a movement amount of a lower end of a main body in the case where an inclination angle of the main body is changed from 0° to 5° with the movement amount of that of the related art.
Figure 9A:
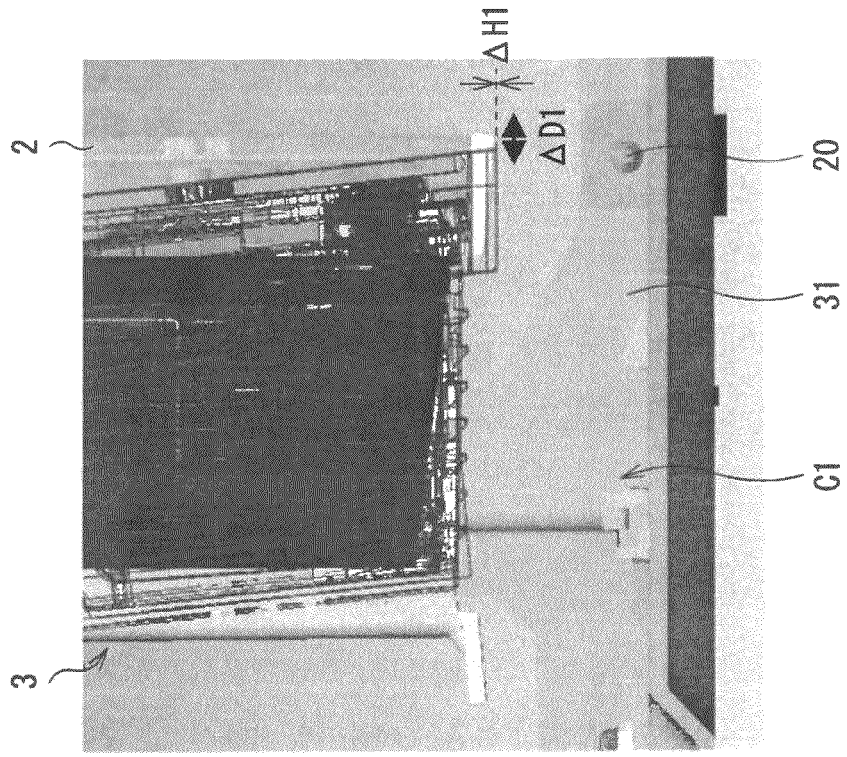

FIG. 9A is a simulation result when the movement amount of the lower end of the main body 2 has been investigated in the case where the inclination angle of the main body 2 has been changed from the first angle θ1=0° to the second angle θ2=5°. In this embodiment, the movement amount of the main body 2 has been that ΔD1=3 mm in a depth direction, and ΔH1=0 mm in a height direction.

FIG. 9B is a simulation result when a main body 102 has been inclined from 0° to 5° in the same manner as the main body 2, and the movement amount of a lower end of the main body 102 has been investigated in the case where a stand 103 by a hinge mechanism of the related art has been used. In the stand 103 by the hinge mechanism of the related art, the movement amount of the main body 102 has been that ΔD2=9 mm in a depth direction, and ΔH2=5.3 mm in a height direction.

Figure 10:
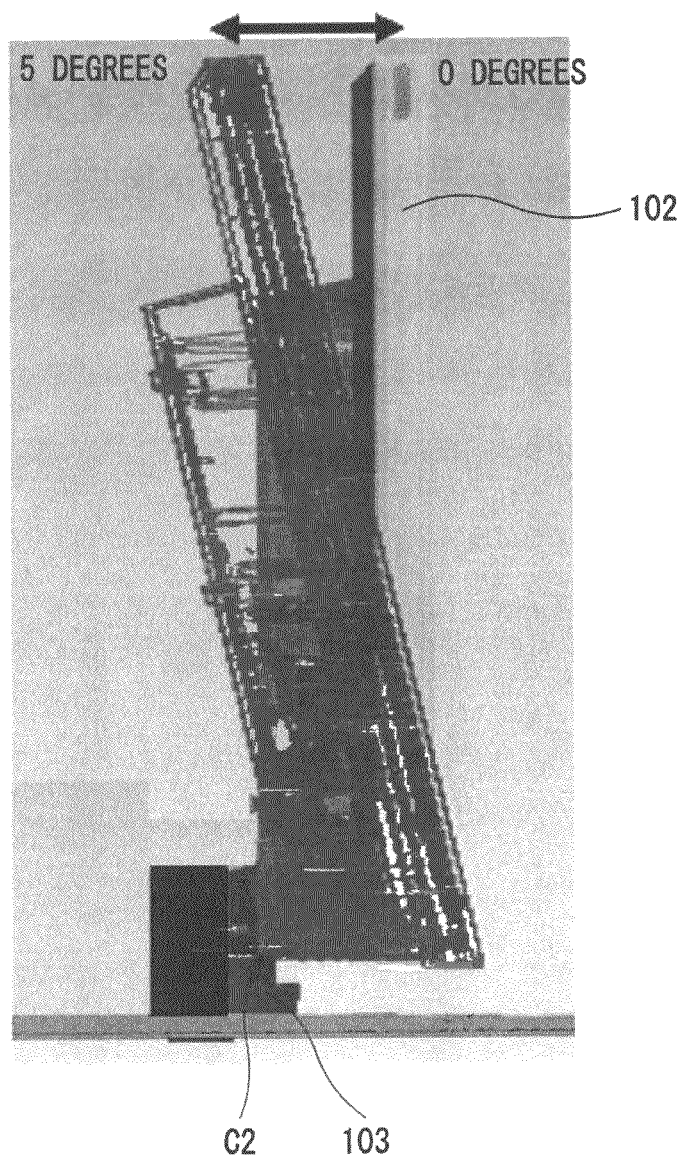
FIG. 10 is a view illustrating a state of movement of a whole main body in the case where an inclination angle of the main body is changed from 0° to 5° in a tilt mechanism of the related art.

As can be seen from FIGS. 9A and 9B, in this embodiment, the movement amounts ΔD1 and ΔH1 of the lower end of the main body 2 are extremely smaller compared with those of the stand 103 using the hinge mechanism of the related art. This is because it is possible to place a tilt rotation center C1 immediately below the main body 2 in this embodiment. On the other hand, as illustrated in FIG. 10, a tilt rotation center C2 is a bonding section for the main body 102 and the stand 103, and the movement amount of the upper end and the lower end of the main body 102 is thus remarkably increased in the case of the related art.

In this embodiment, the leg sections 31 of the arm 30 are rotatable around the shaft 20, while the body section 32 bending from the leg sections 31 is provided with the lower screw hole 32A and the upper screw hole 32B, and the main body 2 as the support object is fixed to the body section 32. Meanwhile, the lower section 41 of the holder 40 is placed on the base plate 10, the middle section 42 upstanding at the first angle θ1=0° from the lower section 41 is provided with the first screw hole 42A corresponding to the lower screw hole 32A, and the upper section 43 provided at the second angle θ2=5° from the middle section 42 is provided with the second screw hole 43A corresponding to the upper screw hole 32B. Therefore, the body section 32 of the arm 30 is fixed to be in contact with either the middle section 42 or the upper section 43 of the holder 40 by the rotation of the leg sections 31 of the arm 30, and it is thus possible to switch the tilt angle of the main body 2 as the support object which is fixed to the body section 32 of the arm 30. Thus, the user alone can easily change the tilt angle of the main body 2 without using power from a motor or the like.

The stand 3 has a simple structure constituted of the base plate 10, the shaft 20, the arm 30, and the holder 40, and it is possible to change the tilt angle with the sufficient strength despite the extremely small number of components and the low cost. Thus, it is possible to obtain the sufficient strength even in the case where the main body 2 is heavy like that of the large-size television device, and a complicated component structure like the hinge structure of the related art is not necessary, enabling the tilt operation R2 of the main body 2 to be performed with a simple operation. Further, complicated and costly components such as a hinge and a motor are not necessarily used, and it is possible to reduce the cost of the stand 3.

The rotation center C1 of the tilt operation R2 may be disposed immediately below the main body 2, and it is thus possible to extremely reduce the movement amount of the main body 2. Therefore, the risk that design harmony between the main body 2 and the stand 3 is lost is reduced by the tilt operation R2.

In addition, it is possible to minimize a shift of the tilt angle of the stand 3 and inclination of the stand 3 by performing a final fine adjustment in which the inclination of the stand 3 caused by accumulation of tolerance of each component is absorbed. For example, in the above-described embodiment, although the case where the tilt angle of the main body 2 is switched to either the first angle θ1=0° or the second angle θ2=5° has been described, the final fine adjustment of the tilt angle may be performed, for example, by adjusting the height of the stepped seat 42B of the middle section 42 in the holder 40, the first convex 41A of the lower section 41 in the holder 40, the second convex 11A of the bottom face section 11 in the base plate 10, or the ear piece 31D of the leg section 31 in the arm 30. This fine adjustment of the angle may be easily performed, for example, by fine adjustment of a die.

Although the present invention has been described with the embodiment, the present invention is not limited to the above-described embodiment, and various modification may be made. For example, in the above-described embodiment, although the case where the body section 32 of the arm 30 is switched to be placed at the first angle θ1=0° and the second angle θ2=5° has been described as an example for the sake of simplicity, it is possible to realize the tilt operation R2 at any angles with the same structure.

The present application contains subject matter related to that disclosed in Japanese Priority Patent Application JP 2010-019251 filed in the Japan Patent Office on Jan. 29, 2010, the entire contents of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A television device including a flat-plate main body displaying an image, and a stand supporting the main body as a support object, the stand comprising:
- a base member including a bottom face section and a pair of bearing sections projecting upward from the bottom face section;
- a shaft member bridged between the pair of bearing sections;
- an arm member including a leg section rotatably fixed to the pair of bearing sections by the shaft member, and a body section provided to bend from the leg section, provided with a lower screw hole and an upper screw hole that are provided on a same planar surface of the body section, and fixed to the support object; and
- a receiving member including a lower section provided on the bottom face section, a middle section upstanding at a first angle from the lower section and including a first screw hole corresponding to the lower screw hole, and an upper section provided at a second angle, which is different from the first angle, from an upper end of the middle section and provided with a second screw hole corresponding to the upper screw hole.

2. The television device according to claim 1, wherein the middle section of the receiving member includes a stepped seat mounting a lower end of the body section of the arm member in the case where the body section of the arm member is placed at the first angle.

3. The television device according claim 2, wherein
the arm member includes an ear piece laterally projecting from the lower side of the leg section, and
the ear piece is in surface-contact with the lower section of the receiving member in the case where the body section of the arm member is placed at the second angle.

4. The television device according to claim 3, wherein
the body section of the arm member includes a dowel in a vicinity of the upper screw hole, and
the upper section of the receiving member includes a hole in which the dowel is fitted in the case where the body section of the arm member is placed at the second angle.

5. The television device according to claim 4, wherein the receiving member includes an auxiliary fixing section projecting on a rear face side of the middle section and fixed to the bottom face section.

6. The television device according to claim 5, wherein the first angle is set to a vertical direction (0 degree), and the second angle is set to an angle inclined from the vertical direction.

7. The television device including a flat-plate main body displaying an image, and a stand supporting the main body as a support object, the stand comprising
- a base member including a bottom face section and a pair of bearing sections projecting upward from the bottom face section;
- a shaft member bridged between the pair of bearing sections;
- an arm member including a leg section rotatably fixed to the pair of bearing sections by the shaft member, and a body section provided to bend from the leg section, provided with a lower screw hole and an upper screw hole that are provided on a same planar surface of the body section, and fixed to the support object; and
- a receiving member including a lower section provided on the bottom face section, a middle section upstanding at a first angle from the lower section and including a first screw hole corresponding to the lower screw hole, and an upper section provided at a second angle, which is different from the first angle, from an upper end of the middle section and provided with a second screw hole corresponding to the upper screw hole, wherein the middle section of the receiving member includes a stepped seat mounting a lower end of the body section of the arm member in the case where the body section of the arm member is placed at the first angle, the lower section of the receiving member includes a first convex mounting a lower side of the leg section in the case where the body section of the arm member is placed at the first angle, and the bottom face section of the base member includes a second convex mounting the lower side of the leg section in the case where the body section of the arm member is placed at the first angle.

8. A stand comprising:
a base member including a bottom face section and a pair of bearing sections projecting upward from the bottom face section;
a shaft member bridged between the pair of bearing sections;
an arm member including a leg section rotatably fixed to the pair of bearing sections by the shaft member, and a body section provided to bend from the leg section, provided with a lower screw hole and an upper screw hole that are provided on a same planar surface of the body section, and fixed to the support object; and
a receiving member including a lower section provided on the bottom face section, a middle section upstanding at a first angle from the lower section and including a first screw hole corresponding to the lower screw hole, and an upper section provided at a second angle, which is different from the first angle, from an upper end of the middle section and provided with a second screw hole corresponding to the upper screw hole.

* * * * *